(12) United States Patent
Abrams et al.

(10) Patent No.: US 6,192,378 B1
(45) Date of Patent: Feb. 20, 2001

(54) METHOD AND APPARATUS FOR COMBINING UNDO AND REDO CONTEXTS IN A DISTRIBUTED ACCESS ENVIRONMENT

(75) Inventors: Steven R. Abrams, New City; Daniel V. Oppenheim, Croton-on-Hudson; Donald P. Pazel, Montrose; James L. Wright, Chappaqua, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/078,041

(22) Filed: May 13, 1998

(51) Int. Cl.[7] ..................................................... G06F 17/30
(52) U.S. Cl. ............................ 707/204; 707/8; 345/237.2
(58) Field of Search ................................. 707/8, 10, 201, 707/202, 203, 204; 345/237.2

(56) References Cited

U.S. PATENT DOCUMENTS

| | | | |
|---|---|---|---|
| 5,159,669 | * 10/1992 | Trigg et al. ........................ | 345/237.2 |
| 5,170,480 | * 12/1992 | Mohan et al. ...................... | 707/201 |
| 5,485,608 | * 1/1996 | Lomet et al. ....................... | 707/202 |
| 5,729,742 | * 3/1998 | Haebinski et al. .................. | 707/202 |

* cited by examiner

Primary Examiner—Hosain T. Alam
Assistant Examiner—Jean Bolte Fleurantin
(74) Attorney, Agent, or Firm—McGuireWoods, LLP; Stephen C. Kaufman

(57) ABSTRACT

A method and apparatus for combining undo and redo contexts in a distributed access environment is described. A first user gains access to data items residing on a database and modifies the data items. The modifications are incorporated into a user activity log. A subsequent user also accesses and modifies the same data items, which modifications are merged into the activity log. The merged activity log forms one sequential well ordered set of actions, including the modification made by the first user and the subsequent user. The user activity logs may be created for individual data items, individual users or for all modifications made to separate data items. A system for combining undo and redo contexts in a distributed access environment is also described.

32 Claims, 7 Drawing Sheets

FIG.2

Activity Log Data Item "A" (200)

1. "ADD" BY USER OF COMPUTER 10
2. "DELETE" BY USER OF COMPUTER 10
3. "COPY" BY USER OF COMPUTER 20
4. "DELETE" BY USER OF COMPUTER 20
5. "CUT" AND "PASTE" BY USER OF COMPUTER 10
6. "ADD" BY USER IF COMPUTER 20

Activity Log Data Item "B" (210)

1. "ADD" BY USER OF COMPUTER 10
2. "DELETE" BY USER OF COMPUTER 10
3. "COPY" BY USER OF COMPUTER 20
4. "DELETE" BY USER OF COMPUTER 20
5. "CUT" AND "PASTE" BY USER OF COMPUTER 10
6. "ADD" BY USER OF COMPUTER 20

METHOD AND APPARATUS FOR COMBINING UNDO AND REDO CONTEXTS IN A DISTRIBUTED ACCESS ENVIRONMENT

BACKGROUND OF THE INVENTION

1. Field of the Invention

The present invention generally relates to a method and apparatus for constructing undo and redo activity logs in a distributed data access environment and, more particularly, to a method and apparatus for merging undo and redo activity logs to a set of data items modified by at least two users in a distributed data access environment and allowing any of the users to gain access to the merged activity logs in order to undo and redo the activities across prior locks.

2. Background Description

Database technology and file management systems are commonly used for accessing shared sets of data items between several users. Database systems are typically fine grained (e.g., allowing access to well defined data structures or fields) and highly scalable (e.g., allowing a number of users to access the system concurrently). Database systems also usually provide extensive capabilities to query data values across multiple data entries, and even across groupings of data.

In contrast to database systems, file management systems do not provide very good granularity. That is, these systems typically allow access to only whole files at a time. Also, file management systems provide query capabilities to directory content, thus providing poor functionality in comparison to database systems.

However, both database systems and file management systems provide (i) data locking and access, (ii) data changing and (iii) committing changes with access relinquishment. In other words, both systems. provide a means to access data and lock data in order to make and commit changes to the data. "Locking" the data refers to read-write capabilities over the data; whereas "unlocking" the data refers to the relinquishment of the read-write access of the data.

After locking the data, the user may change the data through a number of actions. With proper support from the data management systems, these actions may also be undone with the data restored to its prior state. The manner in which this is accomplished is well known, and typically involves, per action, saving the prior state of the data that was changed. This is referred as to the momento of the action. These activities, comprising actions along with their corresponding mementos, may be incorporated into a user activity log consisting of a set of actions undertaken by the user between the time the data is accessed until the data is committed and access to the data is relinquished. The user's activity log may be accessed and re-accessed by that particular user (i.e., the user who created that specific action log) in order to undo changes or redo undone changes to the data items.

Database management typically account for only a subset of this information. At most, a data management system journals instances of changes, indicating that the data has changed, who changed it, and when it was changed. Data restorations are generally made through backup systems which account for a snapshot of the data at some point in time. The recording of data changes along the mementos is typically done at an application level, outside of the data management system.

Even when a data management journals data changes, including mementos, simple access to this data is insufficient and problematic. Data is often changed in relationship to each other. For example, the creation of a new bank account is accompanied with its insertion into the list of bank records. Undo/redo activities is often done in this context of several data items, and undoing/redoing data on a single item could ultimately place all of the data out of sync.

Situations arise which require more processing to make this data useful to a user. For example, a first user gains access to a first set of data items, which although separately accessed, form a related set of data items where changes to any one item are seldom made without locking all those data items. The first set of data items is now locked and the user may then make any desired changes to the accessed data. After the changes are made the user then relinquishes access to the data items. During the time the user has access and changes the data, the system journals the undo and redo activities for this user. A subsequent user may then gain access to the relinquished data and lock that set of data items with the intention of making further changes. However, the subsequent user does not have the additional capability of undoing and redoing undone changes of the first user. In essence, the activities of the first user are incorporated in the first user's activity log and may only be accessed and re-accessed by that particular user (i.e., the user who created that specific action log) in order to undo changes or redo undone changes to the data items. Accordingly, any subsequent user that accesses the same data item may make subsequent changes to the data item, but a new activity log consisting of a new set of activities undertaken by the subsequent user will then be created.

For example, a first user gains access to a first set of data items. The first set of data items are now locked. The user then makes any desired changes to the accessed data, and thereafter relinquishes access to the data. During the time the user has access and makes changes to the data, the system creates an undo and redo activity log for that user. A subsequent user may then gain access to the same set of data items and lock that set of data items. The subsequent user may also make any appropriate changes to the data items, at which time the system will create another undo and redo activity log for that subsequent user. However, at this point two separate undo and redo activity logs are created and stored within the database, and access to these separate activity logs may only be accessed individually. Thus, for example, the subsequent user cannot recreate (e.g., redo or undo any redone actions) any activities that were performed by the first user, and vice versa, unless the user gains access to the separate activity log.

Because the activity logs are not merged together, restoration of the data items after several changes amongst several users is very difficult to accomplish. That is, data cannot be incrementally restored to prior saved states by previous users across locks without accessing all the user's activity logs and recreating the data in the exact order that it was changed.

The creation of activity logs incorporating undo/redo activities of more than two users becomes even more complicated. In these instances many of the changes to previous logs may lose definition and the changes to the set of data items made by a previous user may not be undone or redone by any subsequent user.

SUMMARY OF THE INVENTION

A method and apparatus for combining undo and redo contexts in a distributed access environment is described.

Data items such as spreadsheet data or word-processing data reside on a distributed network environment, such as a database. A first user gains access to the data items and local copies of the data items are made available on the user's computer (or other means of access and display). At this time, the data items may be modified, including cutting, pasting, copying, adding or a host of other activities.

The modifications to the data items are incorporated into a user activity log, preferably created in the database. The user activity log encapsulates a sequential well ordered set of actions undertaken by the user between the time the data items are accessed until the data items are committed to the database and access to the modified data items is relinquished.

A second or subsequent user may then access the same data items and local copies of the data items are made available to the subsequent user. It is well understood that the subsequent user may also be the first user re-accessing the data item.

The subsequent user modifies the data items, which modifications are merged into the activity log thereby forming one merged user activity log having a sequential well ordered set of actions. Thus, according to the system of the present invention, all modifications to the same data items are merged into one user activity log so that the first user or the subsequent user may undo changes or redo undone changes made by a previous user to that same data item (e.g., make changes to data items over a prior lock). This same method may be utilized for more than two users, as explained in detail below.

In embodiments, one user activity log merging all modifications to all data items is contemplated for use by the system of the present invention. In still further embodiments, separate user activity logs for each user and for each set of data items is also contemplated for use by the system of the present invention. In these further embodiments, the database preferably parses the user activity log for each set of data items in order for a subsequent user to undo changes or redo undone changes in accordance with the system of the present invention.

A system for combining undo and redo contexts in a distributed access environment is also described. In embodiments, data items, a merger, a discriminator, an initial compiler and user activity logs reside on the database. Accessors communicate with the database and retrieve data items and user activity logs. Modifiers modify the data items retrieved by the accessors. The initial compiler creates a user activity log which incorporates the modifications of the data items. The merger merges subsequent modifications of the data items into the user activity log, including those modifications made by previous users. By using the system of the present invention, the user is provided with access to a completely merged user activity log so that the user can undo changes or redo undone changes to the data items.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows two user activity logs created for individual data items.

DETAILED DESCRIPTION OF A PREFERRED EMBODIMENT OF THE INVENTION

Figure 1:
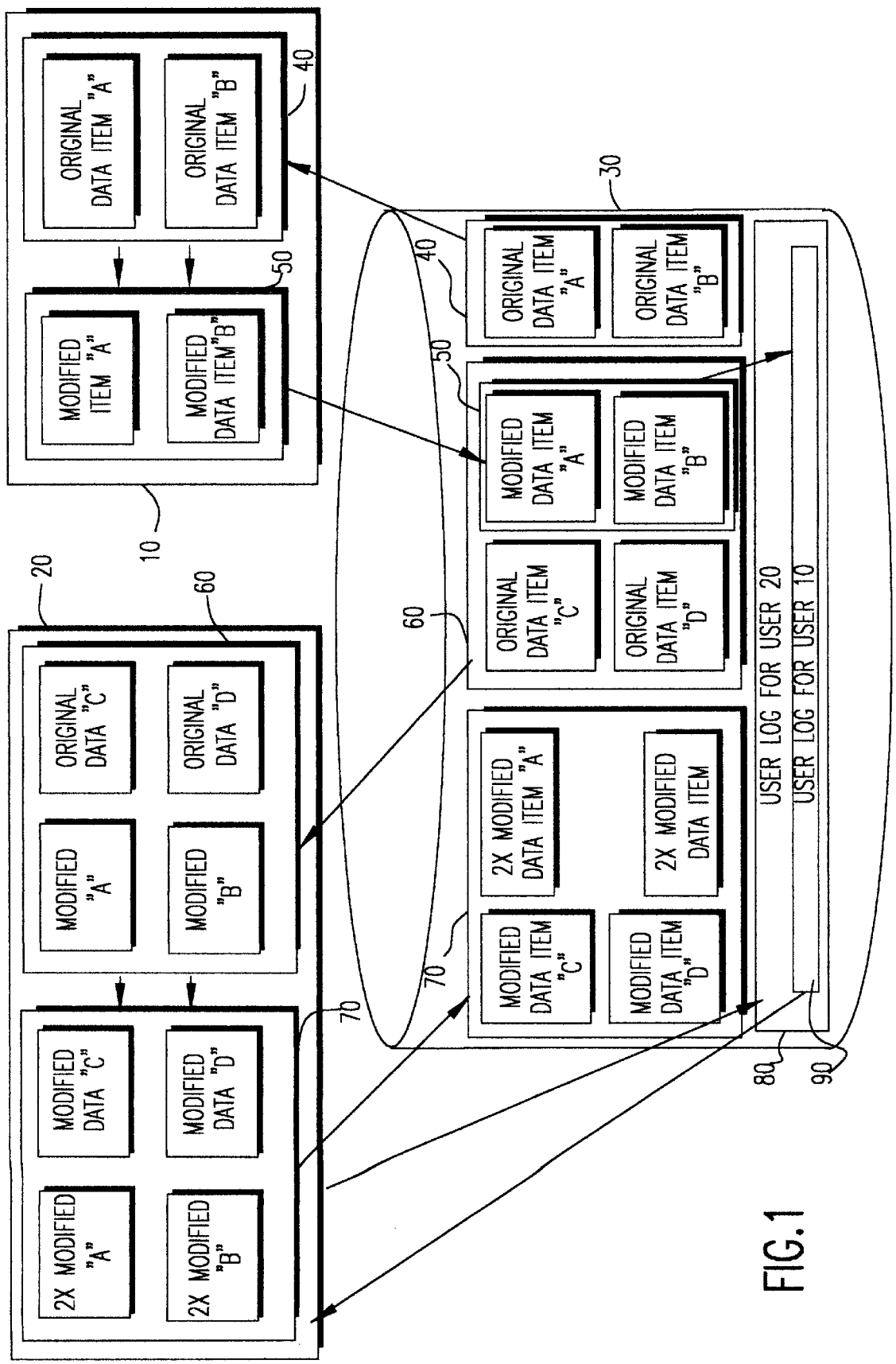
FIG. 1 is a block diagram showing computers accessing a shared distributed environment.

Referring now to the drawings, and more particularly to FIG. 1, there is shown a block diagram of computer 10 and computer 20 accessing a shared distributed environment 30. In preferred embodiments, the shared distributed environment 30 is a database. However, other shared environments, such as, for example, proprietary based servers accessed via the Internet, the World Wide Web portion of the Internet or a dedicated access line are also contemplated for use by the system of the present invention.

FIG. 1 further shows sets of data items 40, 50, 60, 70 and user activity logs 80, 90. The data items 40, 50, 60, 70 and the user activity logs 80, 90 comprise any data item or portions thereof including, but not limited to, spreadsheet data, word-processing data, as well as any other data item associated with any program. Also, the data items 40, 50, 60, 70 and the user activity logs 80, 90 may reside on the database 30. However, the data items 40, 50, 60, 70 and the user activity logs 80, 90 may also reside on separate databases or other distributed environments, depending on the particular use of the present invention.

In embodiments, the data items, 40, 50, 60, 70 may be individually accessed, locked, modified, relinquished and unlocked equally by users of computer 10 and computer 20. However, the present invention is not limited to individually accessing, locking, modifying, relinquishing and unlocking data items equally by users of computer 10 and computer 20. Thus, any number of combinations of data items and users are contemplated for use by the system of the present invention. In embodiments, only one user may modify each data item at one time, while that data item is locked. Thus, for example, when the user of computer 10 accesses and locks data items 40, the user of computer 20 cannot simultaneously access and modify the same data items 40.

Referring again to FIG. 1, the user of computer 10 accesses data items 40 comprising "original data item "A"" and "original data item "B"", which are stored on the database 30. For clarity purposes only, accessing data items 40 by computer 10 will be discussed herein, even though access to other data items may also be accessed. Also, it is well known to those of ordinary skill in the art that original and modified data item "A", data item "B", etc., may be sets of data items.

Local copies of the data items 40 are made available on computer 10 and "original data item "A"" and "original data item "B"" are locked and modifications to the data may be performed. The modifications to data items 40 may include cutting, pasting, copying, adding or a host of other activities.

The modifications to data items 40 result in data items 50 including "modified data item "A"" and "modified data item "B"". The modifications embodied in "modified data item "A"" and "modified data item "B"" are incorporated into a user activity log 90, preferably created in the database 30. In preferred embodiments, the user activity log 90 encapsulates a sequential well ordered set of actions undertaken by the user of computer 10 between the time the data items 40 are accessed until the modified data items 50 are committed and access is relinquished. After all modifications are complete, the modified data items 50 are committed to the database 30 and access to the modified data item 50 is relinquished.

Thus, for example, the user of computer 10 requests a word processing document from the database 30. A local copy of the word processing document is made available on computer 10. The user then performs addition, copy and deletion activities which are incorporated into the user activity log 90 in the order in which the activities were performed. The user may at any time request access to the user activity log 90 in order to undo changes or redo undone changes to the modified data items. The modified data items are then committed to the database 30 for future retrieval.

After the user of computer 10 has relinquished access, the user of computer 20 may access data items 60 comprising "original data item "C"", "original data item "D"", "modified data item "A"" and "modified data item "B"". For clarity purposes only, accessing data items 60 will be discussed herein, even though access to other data items are also contemplated for use by the system of the present invention. Local copies of the data items 60 are made available on computer 20, at which time the data items 60 are locked and modifications to the data items 60 may be performed by the user of computer 20.

The modifications to data items 60 result in data items 70 including "modified data item "C"", "modified data item "D"", "twice modified data item "A"" and "twice modified data item "B"". The changes to the "twice modified data item "A"" and the "twice modified data item "B"" are merged with the activities in user activity log 90 (e.g., "modified data item "A"" and "modified data item "B"") to form a continuous and sequential well ordered user activity log 80 comprising all modifications of data items "A". In alternate embodiments, all of modified data items 70 may be merged into user activity log 80, as discussed below. Accordingly, the user of computer 10 or computer 20 may access all previous modifications to data items that are common to both users (e.g., "modified data item "A"" and "modified data item "B"") in order to undo changes or redo undone changes made by a previous user to that same data item (e.g., make changes to data items over a prior lock).

In embodiments, the user of the computer 10 may access further data items, including the modified data items 70 and make further modifications to the data items 70. The modifications that are common to one set of data items will then be merged into the user activity log 80, in the order the activities were performed. In this manner, any subsequent activities performed on the common data items may be merged into the user activity log 80 in a sequential well ordered set of actions, and may be accessed by subsequent users in order to undo changes or redo undone changes to that common data item.

FIG. 2 shows two user activity logs 200, 210 created for individual data items. In preferred embodiments, separate user activity logs are created for separate data items. Thus, any actions performed to one data item are incorporated into a single user activity log which encapsulates a sequential well ordered set of actions undertaken by the users.

For example, user activity log 200 is created for "data item "A"" and user activity log 210 is created for "data item "B"". Referring to user activity log 200, six actions (e.g., actions 1–6) are shown, including, (i) an "add" activity performed by the user of computer 10, (ii) a "delete" activity performed by the user of computer 10, (iii) a "copy" activity performed by the user of computer 20, (iv) a "delete" activity performed by the user of computer 20, (v)a "cut" and "paste" activity performed by the user of computer 10 and (vi)an "add" activity performed by the user of computer 20. The user activity log 210 also has similar activities associated with data item "B". However, any number of activities and any number of data items may be incorporated and/or merged into the user activity logs.

In the example of user activity log 200, the user of computer 20 performing action six (e.g.,) an "add" activity) may, at any time, request access to the user activity log 200 in order to undo any changes or redo any undone changes made by either of the users of computer 10 or computer 20. Accordingly, for example, the user of computer 20 performing action six may request access to the user activity log 200 in order to undo the "add" activity by the user of computer 10 in action one.

Figure 3:
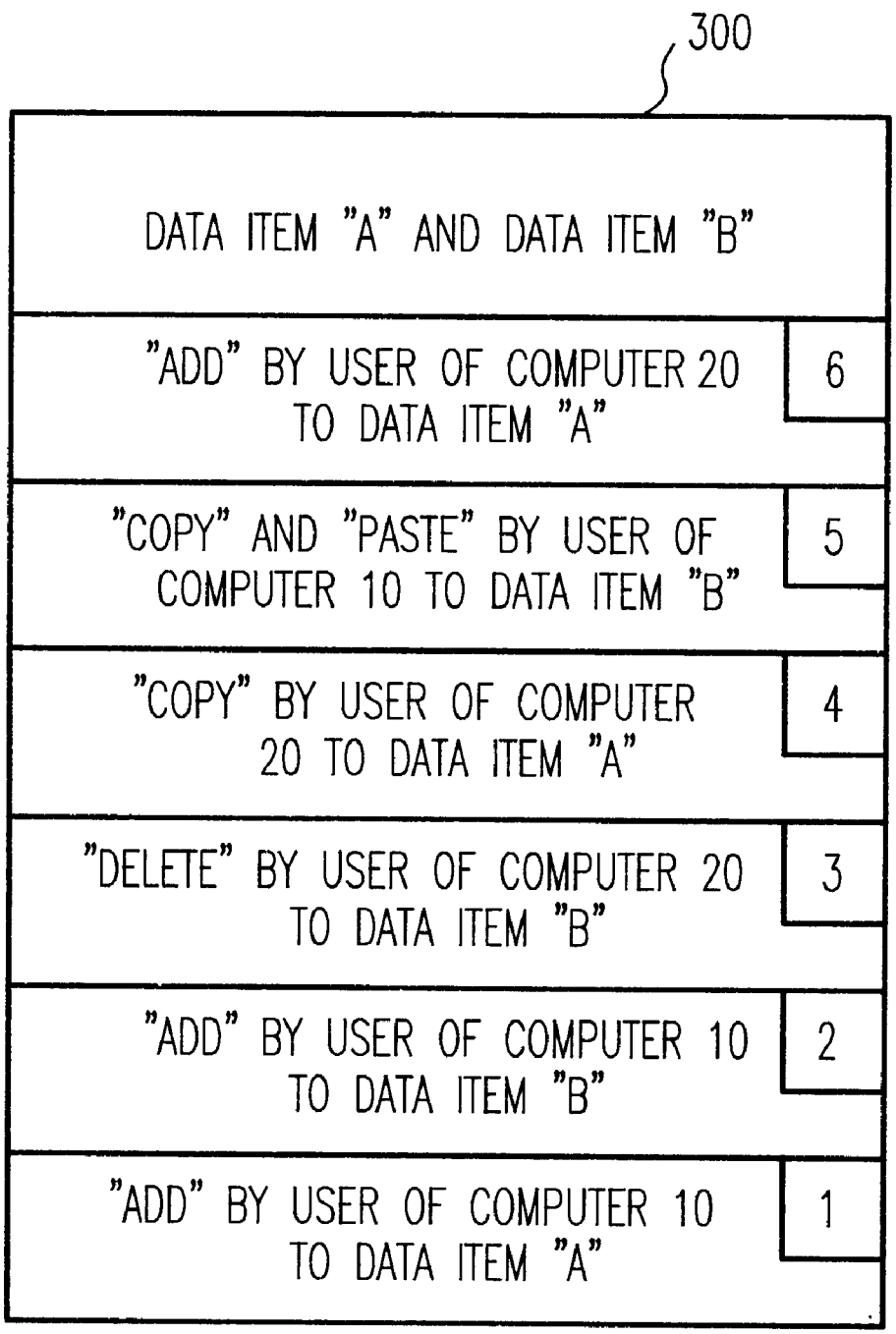
FIG. 3 shows one user activity log for all modifications to all data items.

Referring to FIG. 3, in further embodiments, one user activity log for all data items is shown. According to FIG. 3, user activity logs 200, 210 may be combined to form one user activity log 300. In this embodiment, the database 30 may discriminate between activities of different data items so as to only permit undo changes or redo undone changes to a data item which corresponds to a data item that is currently opened by the user. For example, the user of computer 20 gains access to data item "A" and performs action six (e.g., add). The user of computer 20 can access the user activity log 300 and undo and redo undone changes for all modifications made to data item "A". That is, the user of computer 20 may undo or redo undone changes for activities four and one, in that order.

Figure 4:
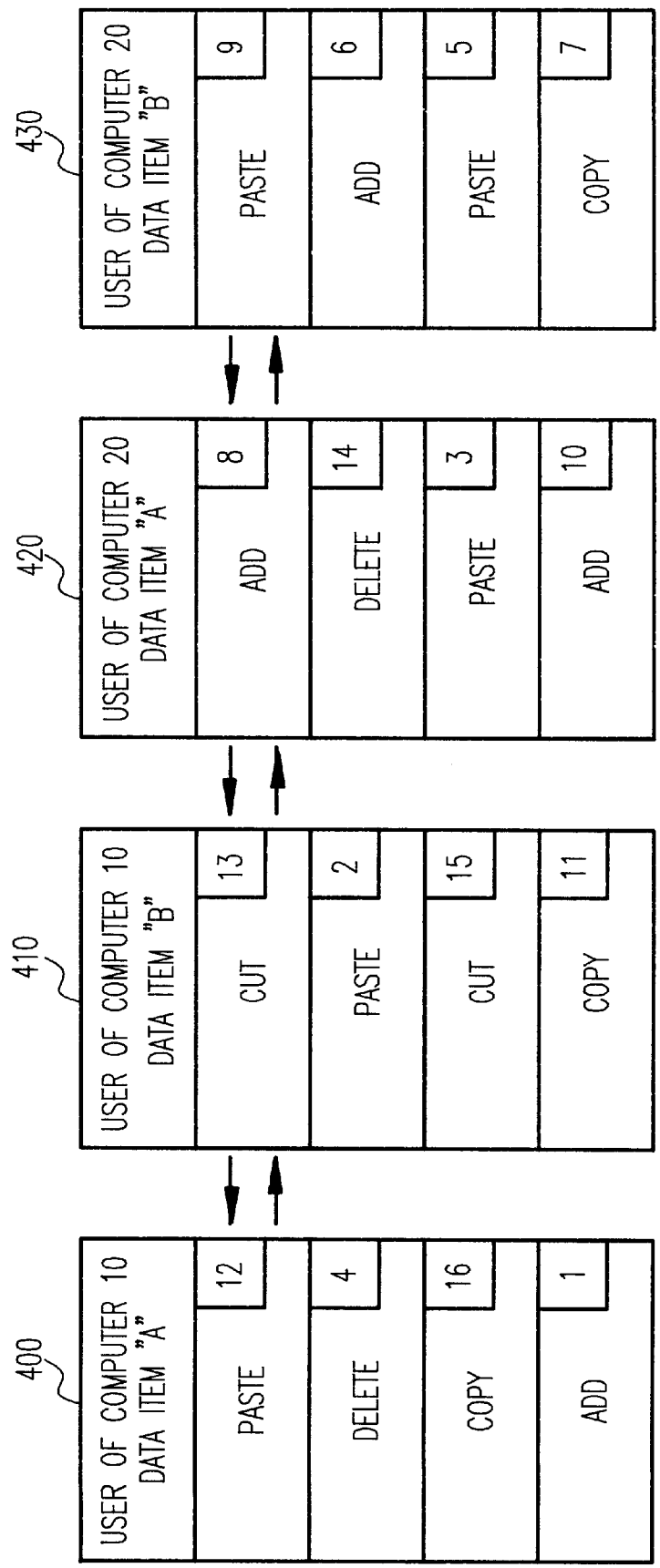
FIG. 4 shows separate user activity logs for separate users.

Referring to FIG. 4, in further embodiments, separate user activity logs for each user and for each set of data item is shown. In these further embodiments, the database 30 provides access to each separate user activity log 400, 410, 420, 430, 440 and parses the user activity logs 400, 410, 420, 430, 440 so that a subsequent user can undo changes or redo undone changes made by a previous user of the data item which is currently being modified.

For example, user activity logs 400, 410, 420, 430, 440 show sixteen actions performed by the users of computer 10 and computer 20 on data item "A" and data item "B". The database 30 parses the actions so that, for example, actions for data item "B" (e.g., two, five through seven, nine, eleven, thirteen and fifteen) are sequentially ordered when the user of computer 10 accessing data item "B", for example, requests an activity log for data item "B". In this example, the user of computer 10 may then perform undo changes or redo undone changes on data item "B", even though some of these actions were performed by the user of computer 20.

Figure 5A:
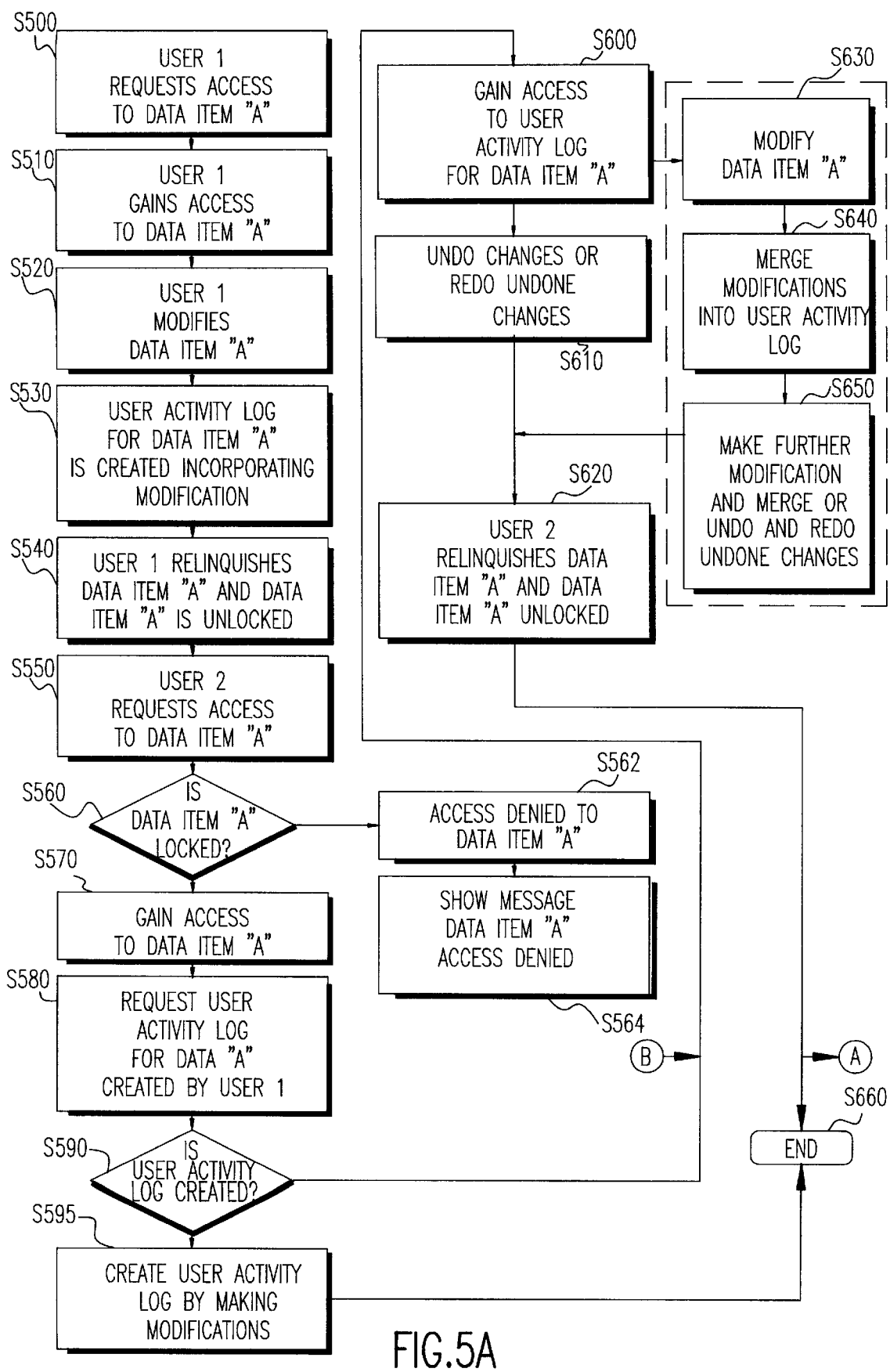
FIG. 5a shows a flow diagram for the acquisition and utilization of a user activity log.

FIG. 5a shows a flow diagram for acquisition and utilization of a user activity log. At step S500, user 1 requests access to data item "A". At step S510, user 1 gains access to the data item "A". At step S520, user 1 modifies the data item "A". As discussed above, modification to the data item may include adding, cutting, pasting, deletions and a host of other activities. At step S530, the modified data of data item "A" is incorporated into a user activity log which encapsulates a sequential well ordered set of actions undertaken by the user. At step S540, user 1 relinquishes data item "A" and data item "A" is then unlocked.

At step S550, user 2 requests access to data item "A". In embodiments, this request is made subsequent to the modifications made by user 1. At step S560, a determination is made as to whether the data item "A" is locked. If the data item "A" is locked, access to data item "A" is denied at step S562. At step S564, an "access denied to data item "A"" or other equivalent message is displayed to user 2. If the data item "A" is not locked, at step S570 user 2 gains access to the data item "A". At step S580, user 2 requests access to the user activity log created by user 1. At step S590, a determination is made as to whether the user activity log is created. If the user activity log is not created (i.e., because no previous modifications were made to data item "A"), at step S595, user 2 makes modifications to the data item "A" and the modified data of data item "A" is incorporated into a user activity log which encapsulates a sequential well ordered set of actions undertaken by the user. The process then ends at step S660. If the determination at step S590 is positive, at step S600, user 2 gains access to the user activity log. At step S610, user 2 may undo changes or redo undone changes made by user 1 that is incorporated into the user activity log. At step S620, user 2 relinquishes the data item "A" and then data item "A" is unlocked. The process then ends at step S660.

In embodiments, at step S630, user 2 makes further modifications to the data item "A". At step S640, the further modifications are merged into the user activity log such that all modifications made by both user 1 and user 2 on data item "A" are sequentially well ordered. In step S650, user 2 may make (i) further modifications to data item "A" or (ii) undo changes or redo undone changes made by either user 1 or user 2 to data item "A". The process then ends at step S660.

In embodiments, user 1 may again access the data and make further modifications or, alternatively, undo changes or redo undone changes made by either user 1 or user 2 to data item "A". In other words, user 1 would perform steps similar to steps S550 to step S660.

In embodiments, the database may terminate the building of the user activity log in the case of three or more users attempting to access the same data items. For purposes of clarity only, this is referred to as the "strong variation". However, in embodiments, three or more users may perform the above tasks in order to merge the user activity logs of more than two users. For purposes of clarity only, this is referred to as the "weak variation".

Figure 5B:
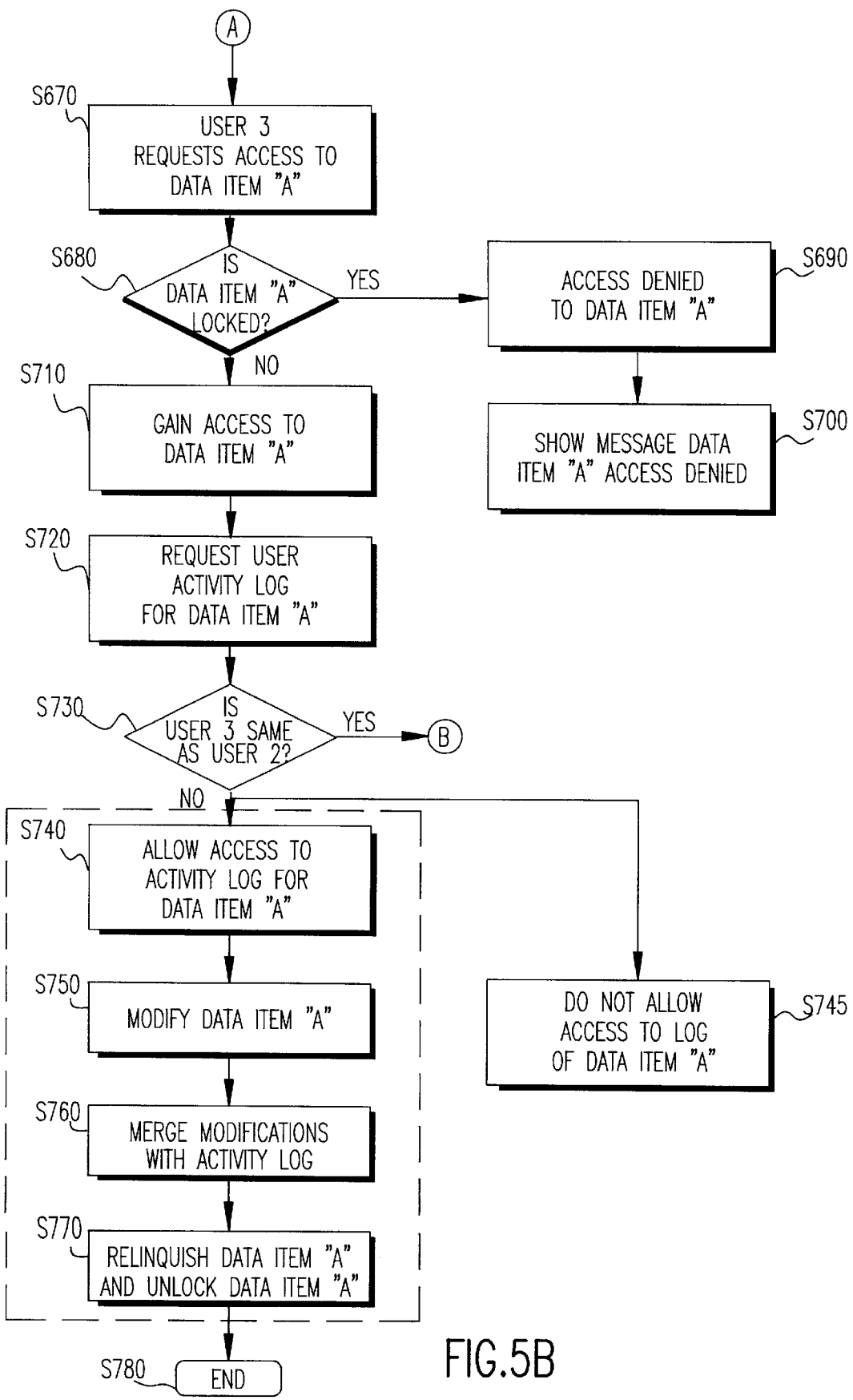
FIG. 5b shows a flow diagram for the acquisition and utilization of a user activity log.

Referring to FIG. 5b, at step S670, a third user requests access to the data item "A". At step S680, a determination is made as to whether the data item "A" is locked. If the data item "A" is locked, at step S690, access to the data item "A" is denied. At step S700, a "data item "A" access denied" message is displayed. If the data item "A" is not locked, at step S710, user 3 gains access to the data item "A". At step S720, user 3 requests the user activity log for data item "A". At step S730, a determination is made as to whether user 3 is the same user as user 1 or user 2. If user 3 is determined to be either user 1 or user 2, then the process begins at step S600 (FIG. 5a) and continues to the end of the process. If user 2 makes modifications to the data items and if user 3 is not the same as user 2, at step S745, access to the user activity log is denied and the process ends (e.g., "strong variation"). However, user 3 may still make modifications to the data item "A" and then a new activity log for user 3 will be created. Alternatively, if user 3 is not the same as user 2, at step S740, access to the user activity log is granted on a limited basis ("weak variation"). That is, access to only those activities on the activity log in which user 1 performed will be available to user 3 (i.e., all activities performed by user 2 to the same data set in which user 1 performed activities will not be available to user 3). At step S750, modifications to the data item "A" are made. At step S760, the modified data of data item "A" is merged into the user activity log. However, because there are three (or more users) some definition of the user activity log may be lost. At step S770, user 3 relinquishes the modified data of data item "A" and the modified data of data item "A" is unlocked for future retrieval and/or modification.

Figure 6:
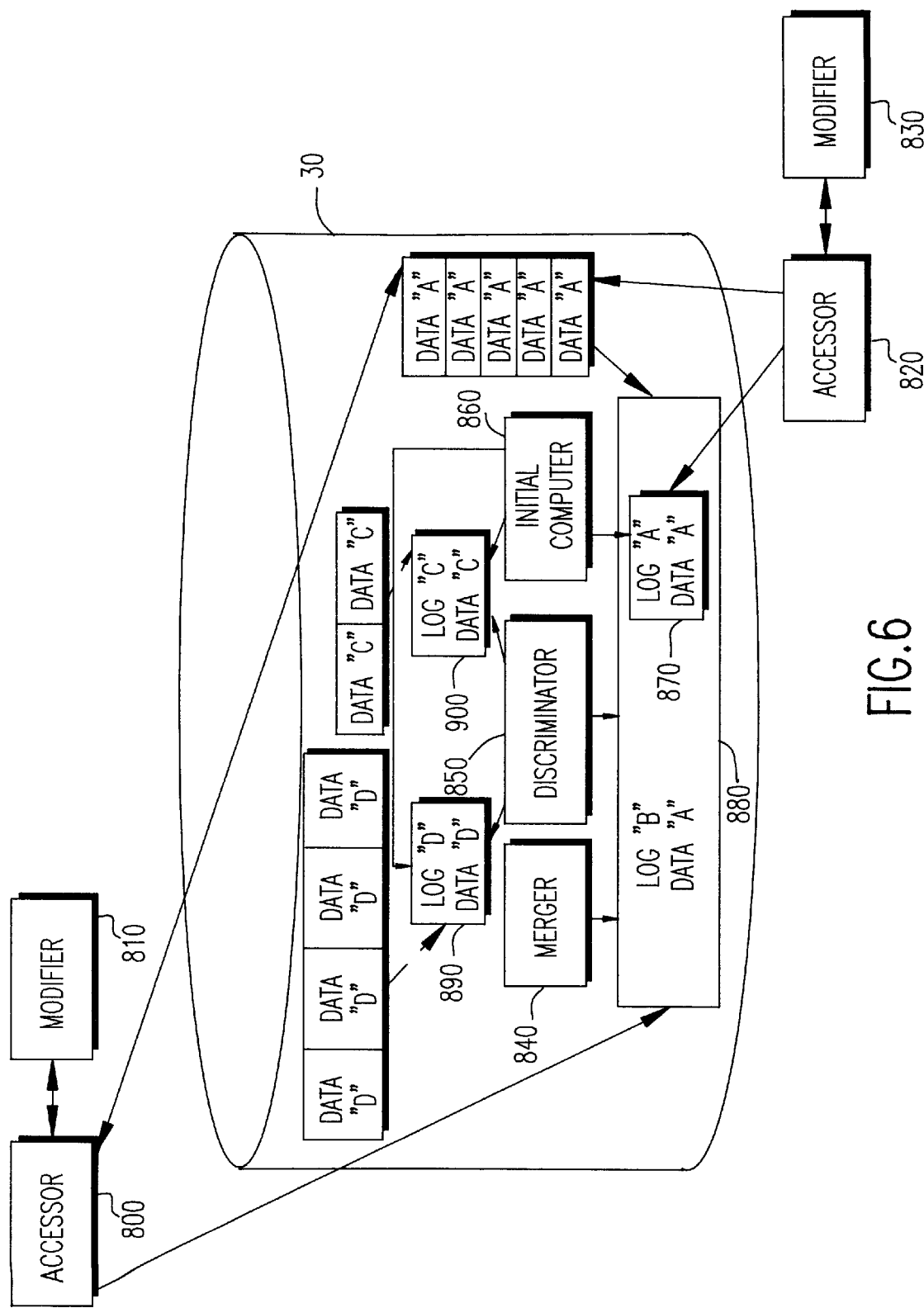
FIG. 6 is a block diagram showing a system for combining undo and redo contexts in a database.

Referring to FIG. 6, a system for combining undo and redo contexts in a database is shown. In embodiments, data items "A", "C" and "D", merger 840, discriminator 850, initial compiler 860 and user activity logs 870, 880, 890 and 900 reside on the database. However, in embodiments, at least the merger 840, the discriminator 850, the initial compiler 860 and the user activity logs 870, 880, 890 and 900 may reside on other components and communicate with the database 30. Accessors 800, 820 communicate with the database and retrieve data items and user activity logs. Modifiers 810, 830 modify the data items retrieved by the accessors 800, 820, respectively.

In embodiments, and for example, the accessor 820 retrieves data items "A". The accessor 820 sends data items "A" to the modifier 830 in order to make modifications to data items "A". In embodiments, the accessor 820 and the modifier 830 may be combined into one unit. The modifier 830 then returns the modified data items "A" to the accessor 820 which, in turn, sends the modified data items "A" to the database 30. The initial compiler 860 then creates a user activity log 870, which incorporates the modifications of data item "A". The accessor 820 and the modifier 830 may also access and modify data items "C" and data items "D", respectively, and the initial compiler 860 may create user logs 890 and 900, respectively.

The accessor 800 retrieves data items "A" and sends data items "A" to the modifier 810 in order to make further modifications to data items "A". Like the accessor 820 and the modifier 830, the accessor 800 and the modifier 810 may be combined into one unit. The modifier 830 then returns the modified data items "A" to the accessor 820 which, in turn, sends the modified data items "A" to the database 30. The merger 840 then creates a user activity log 880 which incorporates all of the modifications of data item "A", including previously performed modifications. The accessor 800 and the modifier 810 may also access and modify other data items, and the merger 860 may create other merged user activity logs. In embodiments, the discriminator 850 determines which data items are being accessed in order to determine which user activity logs should be merged.

According to the system of the present system, the user of the accessor 800 and/or the modifier 810 may undo changes or redo undone changes to the accessed data items. The user of the accessor 820 and/or the modifier 830 may also undo changes or redo undone changes to the accessed data items, in a similar fashion.

In preferred embodiments, the database 30 includes (i) a unique identification of the data item, (ii) the time the data is locked and unlocked and/or committed and (iii) a unique identification of the user holding the lock. In embodiments, items (i)–(iii) may be appended to the activity log for informative purposes.

While the invention has been described in terms of preferred and alternate embodiments, those skilled in the art will recognize that the invention can be practiced with modification within the spirit and scope of the appended claims.

Having thus described our invention, what we claim as new and desire to secure by Letters Patent is as follows:

1. A method of extending user activity logs in a shared distributed data access environment, comprising:

creating a first user activity log by incorporating a first activity performed on a set of data items by a first user into the first user activity log; and sequentially merging a second activity performed on the set of data items by a subsequent user into the first user activity log thereby creating a merged user activity log, wherein the merged user activity log includes a sequential well ordered set of actions including the first activity and the second activity in order from when the first activity and the second activity are initially merged such that the first user or the subsequent user may undo changes or redo undone changes made by a previous user to the data item.

2. The method of claim 1, wherein:

the first activity is incorporated into the first user activity log between a time the set of data items are accessed until the set of data items are committed to the shared distributed environment, and the second activity is merged into the first user activity log to form the merged user activity log between a time the set of data items are accessed until the set of data items are committed to the shared distributed environment.

3. The method of claim 1, further comprising:

accessing the merged user activity log; and unperforming the first activity and the second activity on the set of data items in a reverse order in which the first activity and the second activity were performed.

4. The method of claim 3, wherein the unperforming is at least one of an undo activity and a redo undone activity in a reverse order in which one of the first activity and the second activity were performed on the set of data items.

5. The method of claim 1, wherein the first activity and the subsequent activity include cutting, pasting, copying, deleting and adding data to the set of data items.

6. The method of claim 1, wherein:

the first activity is multiple activities, and the second activity is multiple activities.

7. The method of claim 1, further comprising:

accessing several different sets of data items;

unperforming at least one activity on the several different sets of data items;

creating separate user activity logs for the at least one activity performed on the several different sets of data items; and merging the separate user activity logs into the merged user activity log which includes a sequential well ordered set of actions of at least one activity, wherein the at least one activity includes at least one of the first activity and the second activity.

8. The method of claim 7, further comprising:

discriminating between the activities in the merged user activity log;

accessing the discriminated activities associated only with one set of data items of the several different sets of data items in the merged user activity log; and performing the activities in a reverse order in which the activities were performed.

9. The method of claim 8, wherein the performing is at least one of an undo activity and a redo undone activity in a reverse order in which the activities were performed on the set of data items.

10. The method of claim 1, further comprising:

creating a second user activity log for the subsequent user;

accessing the first user activity log and the second user activity log; and parsing the first user activity log and the second user activity so that activities only associated with one of the first activity and the second activity can be one of undone and redone.

11. The method of claim 1, wherein the set of data items and the merged user activity log are accessed from a database.

12. The method of claim 1, wherein the second activity cannot be performed when the set of data items is locked during performing the first activity.

13. The method of claim 1, wherein local copies of the set of data items are individually available on individual workstations of the shared distributed environment.

14. The method of claim 1, further comprising:

providing a unique identification associated with the set of data items;

providing a time when the set of data items is at least one of locked and unlocked; and providing a unique identification of a user holding a lock for the locked set of data items.

15. The method of claim 1, further comprising:

performing at least a third activity on the set of data items by one of the first user and the second user; and merging the at least third activity into the merged user activity log, wherein the at least third activity is placed in order with respect to the first activity and the second activity.

16. The method of claim 1, further comprising:

performing a third activity on the set of data items by a third or more user;

merging the third activity performed on the set of data items into the first user activity log including the first activity and the second activity performed on the set of data items, wherein the merged user activity log includes a sequential well ordered set of actions including the first activity, the second activity and the third activity in order.

17. The method of claim 16, wherein the merged user activity log which includes the first activity, the second activity and the third activity in order losses definition after the third or more user performs the third activity on the set of data items.

18. The method of claim 1, further comprising:

performing a third activity on the set of data items by a third user;

creating a third user activity log different than the merged user activity log, wherein the third user activity log is not merged with the merged user activity log.

19. The method of claim 18, further comprising:

determining whether the third user is the same as one of the first user and the second user;

denying access to the merged user activity log if the third user is not one of the first user and the second user.

20. A means for extending user activity logs in a shared distributed data access environment, comprising:

first creating means for creating a first user activity log by incorporating a first activity performed on a set of data items into the user activity log; and sequentially merging means for sequentially merging a second activity performed on the set of data items by a second user into the first user activity log thereby creating a merged user activity log, wherein the merged user activity log includes a sequential well ordered set of actions including the first activity and the second activity in order from when the first activity and the second activity are initially merged such that the first user or the subsequent user may undo changes or redo undone changes made by a previous user to the data item.

21. The means for extending user activity logs of claim 20, further comprising:

first accessing means for accessing the merged user activity log; and manipulating means for manipulating the first activity and the second activity, including undoing changes and redoing undone changes to the set of data items.

22. The means for extending user activity logs of claim 20, further comprising first creating means for creating separate user activity logs for several different activities performed on the several different sets of data items, wherein the merging means merges the separate user activity logs into the merged user activity log.

23. The means for extending user activity logs of claim 21, further comprising discriminating means for discriminating between the different activities in the merged user activity log, wherein only activities associated with one set of data items of the several different sets of data items in the merged user activity log are accessed at a single time.

24. The means for extending user activity logs of claim 20, wherein the first creating means creates separate user activity logs for different users.

25. The means for extending user activity logs of claim 24, further comprising parsing means for parsing the separate user activity logs so that one of the first activity and the second activity can be one of undone and redone.

26. The means for extending user activity logs of claim 20, further comprising a performing means for performing a third activity on the set of data items by a third user, wherein the merging means merges the third activity into the merged user activity log.

27. A system that extends user activity logs in a shared distributed data access environment, comprising:

an initial compiler, the initial compiler compiling at least one user activity log based on first activities on a set of data items performed by a first user; and a merger, the merger merging the at least one user activity log with second activities performed by a subsequent user on the set of data items subsequent to the first activities being incorporated into the at least one user activity log thereby creating a merged user activity log, wherein the merged user activity log includes a sequential well ordered set of actions including the first activities and the second activities in order from when the first activity and the second activity are initially merged such that the first user or the subsequent user may undo changes or redo undone changes made by a previous user to the data item.

28. The system of claim 27, further comprising a discriminator, the discriminator discriminating between separate user activity logs so that the merger merges user activity logs having all the same data items of sets of data items.

29. The system of claim 27, further comprising:

at least one accessor, the at least one accessor communicating with the distributed data access environment in order to retrieve data items and the at least one user activity logs; and at least one modifier, the at least one modifier being associated with the at least one accessor, respectively, the at least one modifier modifying the data items retrieved by the accessors.

30. The system of claim 29, wherein the at least one accessor retrieves the merged user activity log.

31. The system of claim 29, wherein the at least one accessor and at least one modifier form one unit.

32. The system of claim 23, wherein the distributed data access environment is a shared database.

* * * * *